Figure 1:
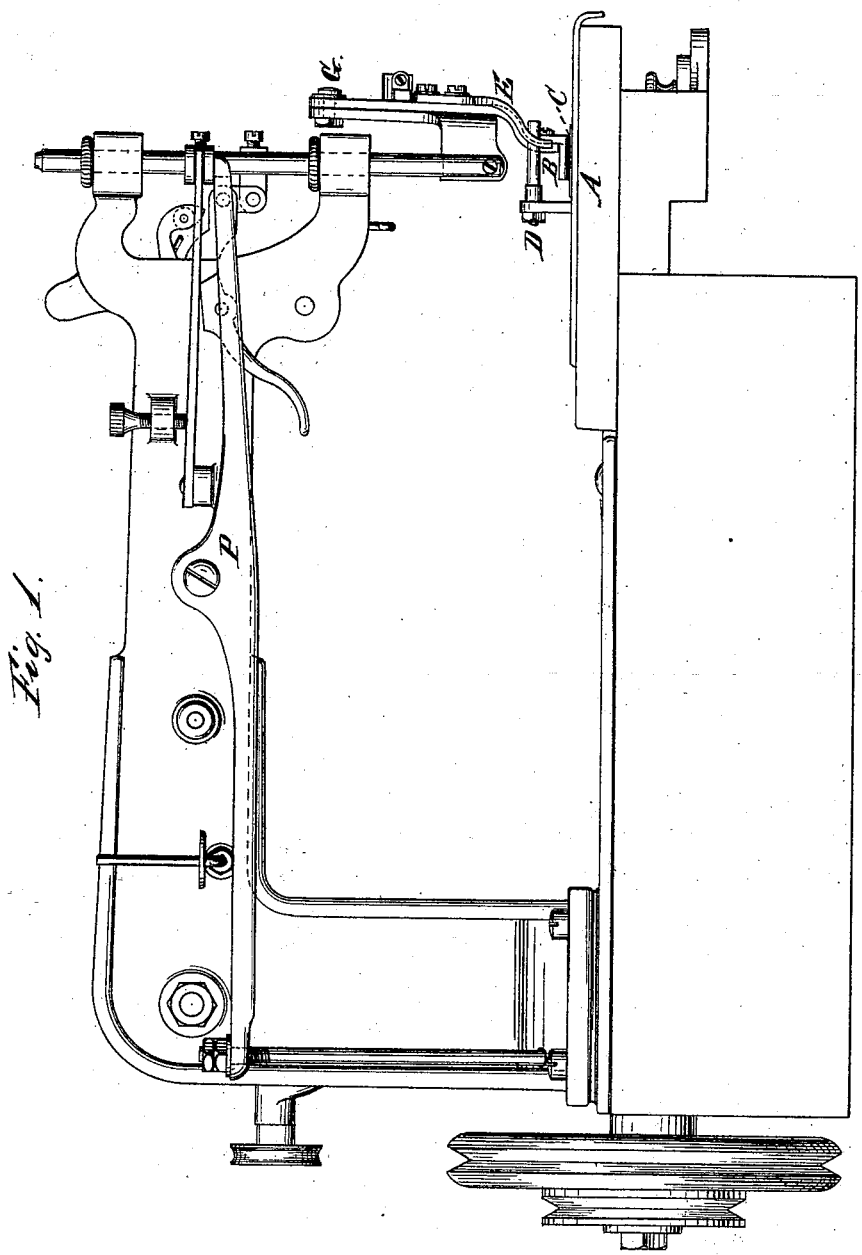

2 Sheets—Sheet 1.

G. H. DIMOND.
Gathering Devices for Sewing-Machines.

No. 196,198.      Patented Oct. 16, 1877.

Witnesses
W. L. Bennem.
John W. Ripley

Inventor
George H. Dimond
by S. J. Gordon his Atty.

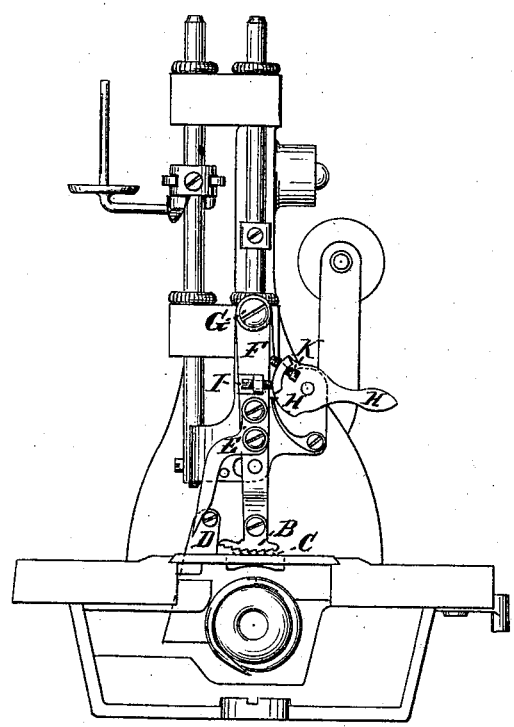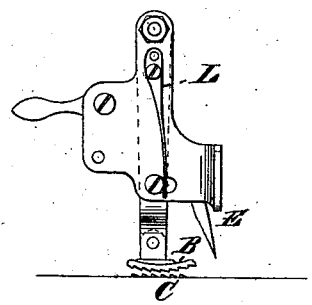

UNITED STATES PATENT OFFICE.

GEORGE H. DIMOND, OF BRIDGEPORT, CONNECTICUT, ASSIGNOR TO WHEELER & WILSON MANUFACTURING COMPANY.

IMPROVEMENT IN GATHERING DEVICES FOR SEWING-MACHINES.

Specification forming part of Letters Patent No. 196,198, dated October 16, 1877; application filed July 26, 1877.

*To all whom it may concern:*

Be it known that I, GEORGE H. DIMOND, of Bridgeport, county of Fairfield, State of Connecticut, (assignor to the WHEELER & WILSON MANUFACTURING COMPANY, a corporation established by law of said State, and located at said Bridgeport,) have invented a new and useful Improvement in Sewing - Machines, which is fully set forth in the following specification and accompanying drawings, in which—

Figure 1 is a side view of a sewing-machine with my improved gathering mechanism thereon. Fig. 2 is a front view of the same; Fig. 3, a back view of the gatherer.

The object of my invention is to produce an attachment which will gather the upper of two pieces of fabric to be stitched, or the lower or first one, and then the other, or neither, as the operator requires.

In the drawings, A represents the cloth-plate; B, the vibrating four-motion top-feed dog; C, the four-motion under-feed dog; D, the top-feed-actuating arm and stud; E, the swinging-lever arm; F, the swinging lever; G, the pivot thereof; H, the top-feed regulator; I, its adjusting-screw No. 1; K, its adjusting-screw No. 2; L, the top-feed spring; P, the top-feed lifting-lever.

The operation is as follows: If it is desired to gather the under piece of fabric, depress the lever of regulator H, so that the projecting segment thereof is entirely clear of adjusting-screw No. 1. The under feed is actuated as is usual in sewing-machines. As it moves forward, the stud on arm D moves lever-arm E, which actuates swinging lever F, and carries top-feed dog B forward the entire length of its stroke, and beyond the point to which the under feed has carried the lower material. Lifting-lever P now raises the top-feed dog, spring L throws it back, lifting-lever P is released, and the top-feed dog drops, ready for a second advance.

To gather the top piece, raise the lever of regulator H until adjusting-screw No. 2 stops swinging lever E from coming back to the end of its stroke. The step of the top feed is thereby shortened.

To sew a seam without gathering, set regulator H so that adjusting-screw No. 1 strikes against the projecting segment, which leaves both feeds to travel equal spaces.

Thus it is manifest that by the adjustment of regulator H the upper piece of fabric may be gathered; then both pieces may be stitched without gathering; then the lower piece gathered, and so on, according to the variations of work required.

What I claim, and desire to secure by Letters Patent, is—

1. The combination of the lower-feed dog, its carrier provided with projection D, the upper-feed dog and its lever F, having arm E, as and for the purpose set forth.

2. The combination of the upper-feed lever F, having arm E, vibrating lever P and its retracting-spring, and the lower-feed dog carrier, having projection D, as and for the purpose set forth.

3. The combination, with the head of the machine, of the upper-feed lever F and its adjusting devices H I K, as and for the purpose set forth.

GEORGE H. DIMOND.

Witnesses:
 A. STEWARD,
 E. S. BOYNTON.